United States Patent
Kalhori et al.

(10) Patent No.: US 11,084,139 B2
(45) Date of Patent: Aug. 10, 2021

(54) SENSOR MODULE AND TOOL HOLDER FOR A CUTTING TOOL

(71) Applicant: SANDVIK INTELLECTUAL PROPERTY AB, Sandviken (SE)

(72) Inventors: Vahid Kalhori, Gavle (SE); Robin Karlsson, Gavle (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 16/064,058

(22) PCT Filed: Dec. 20, 2016

(86) PCT No.: PCT/EP2016/081829
§ 371 (c)(1),
(2) Date: Jun. 20, 2018

(87) PCT Pub. No.: WO2017/108731
PCT Pub. Date: Jun. 29, 2017

(65) Prior Publication Data
US 2019/0001456 A1 Jan. 3, 2019

(30) Foreign Application Priority Data
Dec. 22, 2015 (EP) .................................... 15201847

(51) Int. Cl.
*B23Q 17/22* (2006.01)
*B23Q 17/09* (2006.01)
(Continued)

(52) U.S. Cl.
CPC ........ *B23Q 17/0957* (2013.01); *B23B 31/005* (2013.01); *B23B 31/02* (2013.01);
(Continued)

(58) Field of Classification Search
CPC ............ B23Q 17/0952; B23Q 17/0957; B23B 49/001; B23B 49/00; B23B 2231/10; B23B 2260/128; B23B 2270/32; B23B 2270/48
See application file for complete search history.

(56) References Cited

U.S. PATENT DOCUMENTS 4,507,834 A * 4/1985 Chen ..................... B23B 49/001
29/26 R
8,113,066 B2 2/2012 Eckstein et al.

FOREIGN PATENT DOCUMENTS

CN 103341790 A 10/2013
DE 10029953 A1 8/2004
(Continued)

OTHER PUBLICATIONS

English translation of DE 102007001620, Jul. 2008 (Year: 2008).*
English translation of JP H02172656, Jul. 1990 (Year: 1990).*
English translation of JP 60217008A, Apr. 1984 (Year: 1984).*

*Primary Examiner* — Alan Snyder
(74) *Attorney, Agent, or Firm* — Corinne R. Gorski

(57) ABSTRACT

A sensor module for a tool holder for a cutting tool, such that when the sensor module is arranged to the tool holder having a cutting tool connected thereto, an axial portion of the cutting tool is positionable in a predefined rest position with respect to the sensor module. The sensor module includes at least one position sensor, wherein, when the sensor module is arranged to the tool holder having a cutting tool connected thereto, the position sensor is located radially spaced from the axial portion of the cutting tool for measuring deflection of the cutting tool with respect to the rest position. The disclosure further relates to a tool holder, a cutting tool, a cutting assembly, and a method for measuring deflection of a cutting tool.

16 Claims, 3 Drawing Sheets

(51) Int. Cl.
*B23B 49/00* (2006.01)
*B23B 31/02* (2006.01)
*B23B 31/00* (2006.01)
*B23B 31/30* (2006.01)

(52) U.S. Cl.
CPC .......... *B23B 31/305* (2013.01); *B23B 49/001* (2013.01); *B23Q 17/0952* (2013.01); *B23B 31/008* (2013.01); *B23B 2260/128* (2013.01)

(56) References Cited

FOREIGN PATENT DOCUMENTS

| | | | | |
|---|---|---|---|---|
| DE | 102007001620 | A1 | 7/2008 | |
| EP | 0141576 | A1 | 5/1985 | |
| EP | 2052810 | A1 | 4/2009 | |
| JP | 60217008 | A * | 10/1985 | ......... B23Q 17/0957 |
| JP | S63102854 | A | 5/1988 | |
| JP | H02172656 | A | 7/1990 | |
| JP | 2011240423 | A | 12/2011 | |
| RU | 2540455 | C2 | 2/2015 | |
| SU | 1093407 | A1 | 5/1984 | |
| SU | 1373491 | A1 | 2/1988 | |
| SU | 1516237 | A1 | 10/1989 | |
| WO | 2004067225 | A1 | 8/2004 | |
| WO | 2009053323 | A | 4/2009 | |
| WO | 2010042039 | A1 | 4/2010 | |

\* cited by examiner

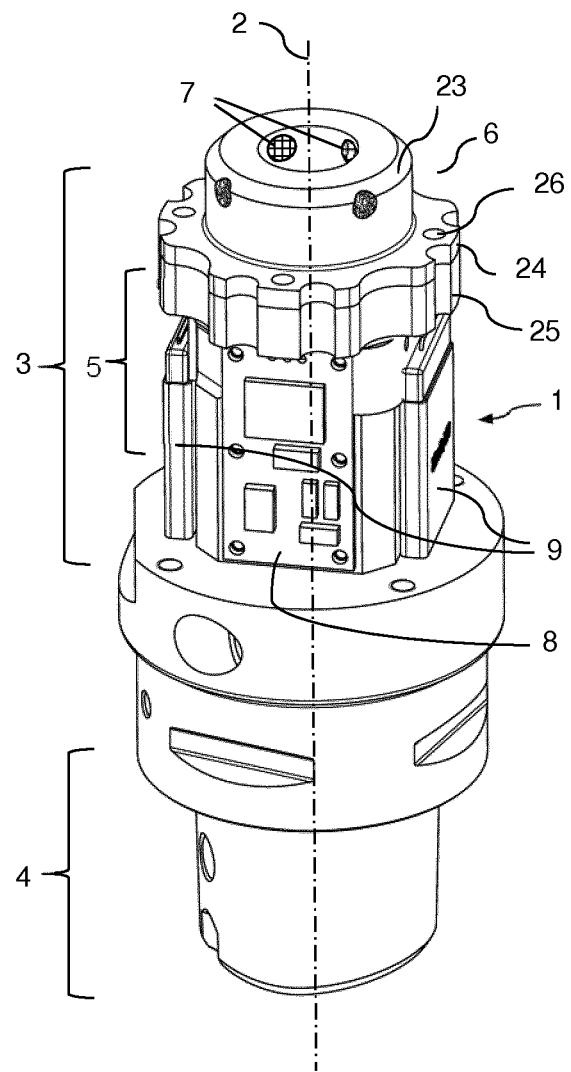
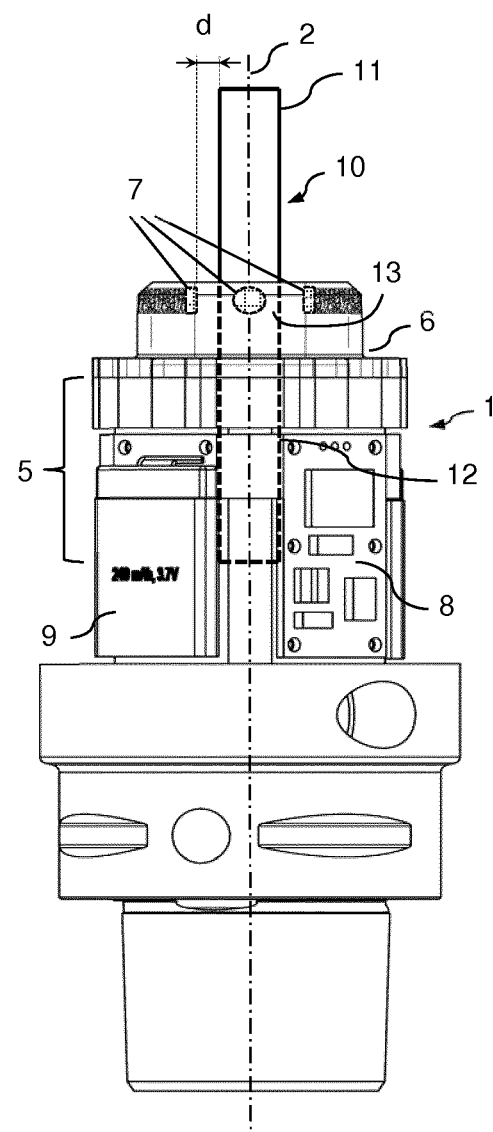
Figure 1
Figure 2

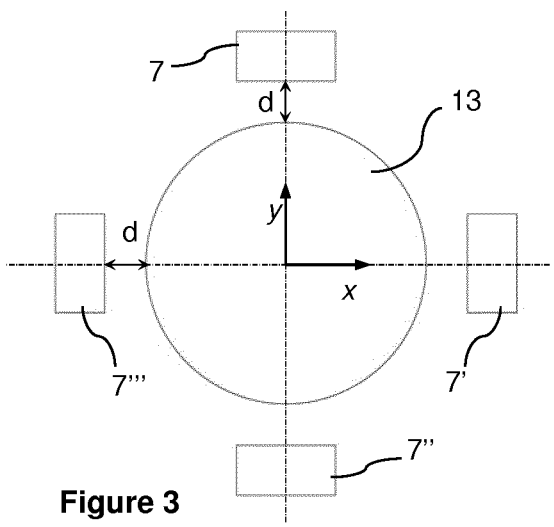
Figure 3
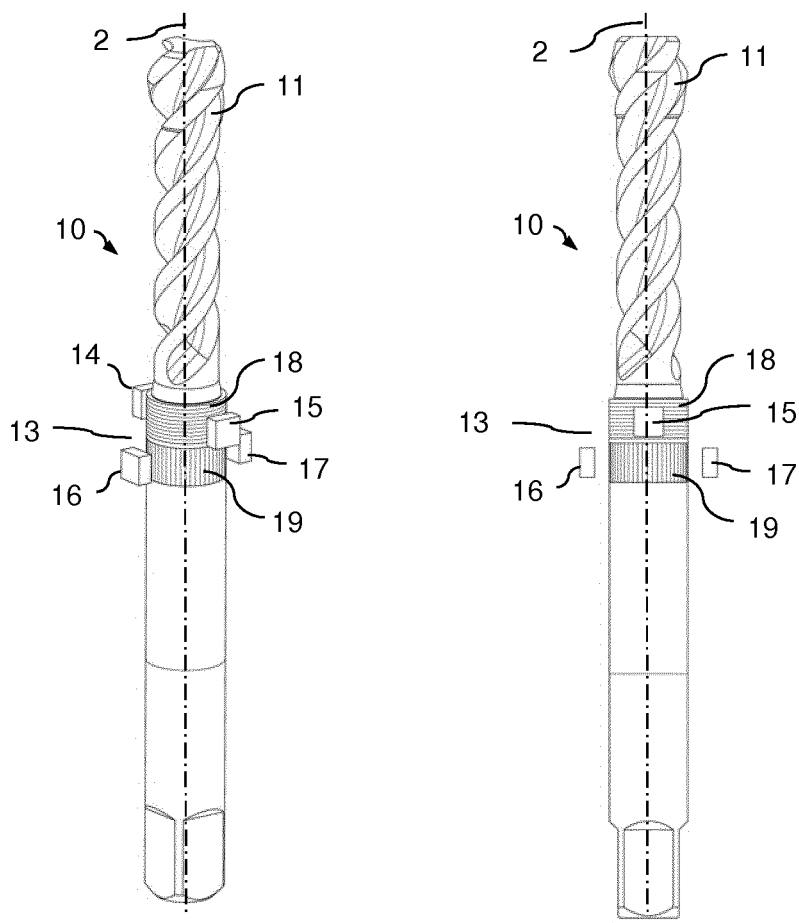
Figure 4
Figure 5

US 11,084,139 B2

SENSOR MODULE AND TOOL HOLDER FOR A CUTTING TOOL

RELATED APPLICATION DATA

This application is a § 371 National Stage Application of PCT International Application No. PCT/EP2016/081829 filed Dec. 20, 2016 claiming priority to EP 15201847.9 filed Dec. 22, 2015.

TECHNICAL FIELD

The invention relates to a sensor module, a tool holder, a cutting tool, a cutting assembly, and a method for measuring deflections of a cutting tool.

BACKGROUND ART

It is known to monitor a machining process, for example in order to optimize machine utilization and machining productivity, improve process reliability and prevent tool breakage.

Process monitoring has sometimes been realized through implementation of sensors mounted on the tool holder or the machine tool spindle, capturing cutting forces or torque or other process parameters. However, such measurements require extensive calibration and error correction due to the change of system stiffness and inertia at the spindle, tool holder, and cutting tool interface. U.S. Pat. No. 8,113,066 discloses a force-measuring system where a measuring hub assembly comprising strain sensors is inserted as an adapter piece into the chuck of a machine tool, and the cutting tool is inserted into an internal chuck of the measuring hub. The measured strains are in a complex functional relationship with the cutting forces, and substantial analysis is therefore required for determining the cutting forces.

Moreover, strain sensors arranged on the tool holder cannot be used to accurately measure deflection of the tool tip. Instead, the deflection must be calculated on the basis of the measured forces by using mathematical models.

Hence, the accurateness of process parameters, and in particular tool tip deflection, as determined from strain sensors mounted on the tool holder is often inadequate, or at least subject to great uncertainty.

SUMMARY

It is an object of the present invention to mitigate the shortcomings of the prior art and to provide means which facilitate accurate determination of process parameters, such as tool tip deflection and cutting forces, for a machining process.

Thus, the invention relates to a sensor module for a tool holder for a cutting tool. When the sensor module is arranged to the tool holder having a cutting tool connected thereto, an axial portion of the cutting tool is positionable in a predefined rest position with respect to the sensor module. The sensor module comprises at least one position sensor, wherein, when the sensor module is arranged to the tool holder having a cutting tool connected thereto, the position sensor is located radially spaced from the axial portion of the cutting tool for measuring deflection of the cutting tool with respect to the rest position.

Hence, a sensor signal which directly corresponds to the deflection of the cutting tool in relation to the tool holder can be obtained during machining. Such sensor signals may be utilized for accurate determination of the tool tip deflection (for example axial-, radial- or torsional deflection) and corresponding cutting forces. Such process parameters could indicate various conditions, for example conditions of the cutting tool or workpiece, and the parameters might be provided to the machine tool operator and/or used as input to a control system for automatically controlling the machining process.

The sensor module can be applied to many different kinds of tool holders for use with any cutting tool having an axial portion. Such cutting tools often have a substantially cylindrical shape and may be, for example, solid cutting tools or cutting tools having exchangeable or indexable cutting inserts or cutting tips, including rotating cutting tools such as milling tools, drilling tools, tapping tools and boring tools. When the sensor module is applied to a rotating tool holder for such a rotating cutting tool, the sensor module will rotate together with the tool holder and the cutting tool during machining of a workpiece.

An axial portion of a cutting tool should be understood as a portion of which deflection is measured, this portion being located along a central axis of the cutting tool between a cutting portion and a shank portion of a cutting tool. Hence, the axial portion is a part of the cutting tool which is located somewhere between the part which is intended to engage with a workpiece during machining, and the part which is directly connected to the tool holder (e.g. clamped within the tool holder, or connected to the tool holder by other means).

The term "deflection" as used herein in relation to a cutting tool refers to any kind of deflection, including axial deflection, radial deflection, and rotational (i.e. torsional) deflection.

The sensor module may be formed as a separate sensor unit attachable to the tool holder, or a non-detachable, integrated part of the tool holder. The sensor module may comprise more than one position sensor, for example two, three or four position sensors. The sensor module may comprise a plurality of individually arrangable sensor units, wherein each sensor unit has one or more position sensors arranged thereto. Hence, the sensor module may take many different forms. Common for all embodiments is that at least one position sensor is arranged in the sensor module in such a way that, when the sensor module is arranged to a tool holder having a cutting tool connected thereto, the position sensor is located radially spaced from the axial portion of the cutting tool.

The position sensor may be any kind of sensor able to detect positional changes of the axial portion of the cutting tool, in at least one direction.

The rest position of the cutting tool may correspond to a position assumed by the cutting tool when no machining occurs. This rest position may be defined by one or more of a radial, a rotational and an axial position of the axial portion of the cutting tool, as sensed by the at least one position sensor at a time when no machining occurs. Hence, the rest position corresponds to a first position of the axial portion of the cutting tool defined in relation to the sensor module (and thus also in relation to a tool holder to which the sensor module is arranged). A deflection of the cutting tool results in a second position of the axial portion of the cutting tool in relation to the sensor module (and thus the tool holder), wherein this second position is different from the first position in one or more directions (e.g. in an axial, radial and/or tangential direction).

The at least one position sensor may be arranged to measure one or more of:
radial deflection, by sensing the radial distance to the axial portion of the cutting tool, rotational deflection, by sensing tangential movement of the axial portion of the cutting tool, and axial deflection by sensing axial movement of the axial portion of the cutting tool.

The sensor module may comprise two or more position sensors arranged to measure at least radial deflection, wherein the sensors are spaced circumferentially in relation to the circumference of the axial portion of the cutting tool, and wherein sensors being circumferentially adjacent are spaced by an angle less than 180 degrees. Preferably, the sensors are circumferentially spaced by approximately 90 degrees.

Thus, the distance to the axial portion of the cutting tool may be measured in at least two non-parallel radial directions. When arranging the sensors in this way, radial deflection in any direction can be measured using only two sensors, by employing simple trigonometric relations. If applying a circumferential spacing of approximately 90 degrees between the position sensors, the deflection can be determined with the same accuracy in any radial direction.

The sensor module may comprise a first pair of position sensors arranged to measure at least rotational deflection or at least axial deflection, wherein the position sensors of the first pair are spaced circumferentially in relation to the circumference of the axial portion of the cutting tool by an angle of approximately 180 degrees.

By this arrangement, the rotational or axial deflection can be separated from radial deflection by analyzing the signals from both position sensors of the pair. A single position sensor intended for measuring rotational or axial deflection could in some circumstances detect a radial deflection and not be able to separate such signal from a signal caused by a rotational or axial deflection. However, when analyzing the signals from both sensors of the pair, for example by considering the sum or mean value (i.e. the sum divided by 2) of the sensor signals, rotational or axial deflection can be separated from radial deflection. This is because a rotational or axial position change would result in similar sensor signals at both sensors of the pair, while a radial position change would yield corresponding signals but with opposite signs, thereby canceling each other.

The sensor module may also comprise a second pair of position sensors arranged to measure at least rotational deflection or at least axial deflection. The position sensors of the second pair are also spaced circumferentially in relation to the circumference of the axial portion of the cutting tool by an angle of approximately 180 degrees, but arranged such that each position sensor of the second pair is circumferentially spaced from each position sensor of the first pair by an angle of approximately 90 degrees.

Thus, if the first pair is arranged to measure rotational deflection and the second pair is arranged to measure axial deflection, or vice versa, the sensor module can be used for measuring both axial and rotational deflection. Alternatively, all the sensors of both the first pair and the second pair may be arranged for measuring only rotational deflection, or only axial deflection. The position sensors of the first and second pairs may be arranged to also measure radial deflection. This would be possible if the position sensors of the first and second pair are able to also measure the radial distance to the cutting tool, and not only rotational and/or axial deflection. As an alternative, the sensor module may comprise separate sensors for measuring radial deflection.

The at least one sensor may for example be an inductive sensor, an optical sensor, a magnetic sensor, a capacitive sensor, or an ultrasonic sensor.

By using any of these sensors, positional changes of the axial portion of the cutting tool can be measured in a contact-less manner and with high accuracy. Furthermore, there is no need to mount any fragile or expensive parts on the tool itself. A magnetic position sensor may for example be a Hall effect sensor, an eddy current sensor, or a magnetoresistive sensor.

The sensor module may comprise a sleeve-shaped portion, and the sensor module may be attachable to the tool holder such that the axial portion of a cutting tool connected to the tool holder extends through the sleeve-shaped portion. The at least one position sensor may be arranged at an inner surface of the sleeve-shaped portion.

By using a sensor module partly shaped as a sleeve, a robust sensor module is obtained which is easily fitted to a tool holder. When the sensor module is arranged to a tool holder with a cutting tool connected thereto, the inner surface of the sleeve-shaped portion faces the cutting tool. The sleeve-shaped portion may have the form of a tubular sleeve wherein the inner surface corresponds to an inner circumference of the tubular sleeve.

According to another aspect, the invention relates to a tool holder for a cutting tool comprising a sensor module as described herein. The tool holder also comprises a tool holder body having a rear coupling end portion and a front tool end portion and a tool holder central axis extending there between, wherein the sensor module is arranged to the tool end portion. The coupling end portion is attachable to a machine tool. The tool end portion includes a cutting tool connection portion.

The tool holder may be any kind of tool holder for a cutting tool to which the sensor module is arrangable. The coupling end portion of the tool holder is attachable to a machine tool via, for example, a spindle, a turret or a tool post, depending on machine tool type. The coupling end portion of the tool holder may be of any conventional type, or adapted for a modular quick-change tooling system, such as, for example, Coromant Capto® or HSK.

The tool end portion is opposite the coupling end portion and is the portion from which a cutting tool, when connected to the tool holder, extends. The cutting tool may extend from the tool end portion in the forward direction.

The tool holder may comprise the sensor module as an integrated part of the tool end portion of the tool holder. Hence, the sensor module could be formed as an integral part of the tool holder already during manufacture of the tool holder. Alternatively, the tool end portion of the tool holder may comprise means for detachably or non-detachably holding the sensor module. The sensor module may be arranged to the tool end portion of the tool holder in various different ways, such as, for example, by means of screws, bolts, gluing, brazing, soldering, etc.

The cutting tool connection portion is the portion at which a cutting tool is connected, or is connectable. Hence, the cutting tool connection portion may correspond to the portion of a tool holder at which a cutting tool is non-detachably connected, or at which a cutting tool may be firmly clamped, or the most anterior part of such portion.

The sensor module is arranged to the tool end portion such that the at least one position sensor is located forward of the cutting tool connection portion in the axial direction of the tool holder body.

The tool holder may comprise a displacement sensor arranged to detect if a cutting tool connected to the cutting tool connection portion of the tool holder is slipping in relation to the cutting tool connection portion. Alternatively, the displacement sensor may be arranged as a part of the sensor module.

By using a displacement sensor, slippage of the tool within the tool holder can be separated from deflection as measured by the position sensors. For example, if a rotational position change of the axial portion of the cutting tool is detected by the position sensors and at the same time a corresponding signal is obtained from the displacement sensor, it can be concluded that the tool is actually rotating within the tool holder, e.g. due to insufficient clamping, and not being torsionally deflected. The displacement sensor could be any kind of sensor able to detect slippage of a cutting tool connected to a tool holder, and may for example be an inductive sensor, an optical sensor, a capacitive sensor, a magnetic sensor, an ultrasonic sensor or a mechanical sensor. The displacement sensor may be of similar kind as the position sensors used for detecting deflection, but arranged closer to the cutting tool connection portion.

The tool holder may have a substantially cylindrical shape.

The tool holder may be a chuck, in which case the cutting tool connection portion may be an axial space of the chuck in which a shank end of a cutting tool can be received and clamped. The cutting tool connection portion may be regarded as the most anterior part of the axial space in which the shank is clamped.

The tool holder may be a tool holder for a rotating cutting tool, such as a drilling tool, a milling tool, a boring tool or a tapping tool.

A sensor interface may be arranged for receiving signals from the position sensors and conveying them to on-board processing means, e.g. a microprocessor. The processing means may handle and evaluate the measured deflection, and when appropriate, trigger events such as, for example, transmission of sensor data or any related information to an external computer and/or to a control system. Any analysis of sensor data may take place either at the on-board processing means or at an external computer to which data is transmitted. For transmitting sensor data, the sensor module, or the tool holder, may comprise suitable means therefore. As an example, a radio module for wireless transmission may be employed. The wireless transmission could be based on optical or radio-based (e.g. Wi-Fi or Bluetooth) transmission technology. Thus, sensor data can be transmitted without any need to transmit signals by wire between rotatable and stationary parts.

An on-board power supply, such as one or more batteries, may be used for supplying the sensors and all other electronic components with power.

The power supply, the radio module, the processing means, the sensor interface, and any other electronic components, can be integrated in the sensor module. Alternatively, all or some of the components can be arranged at some other part of the tool holder. Electric leads for conveying the sensor signals are preferably arranged from the position sensors to the sensor interface.

Additional electronic components that may be arranged at the sensor module, or at the tool holder, is, for example, a charging unit and a corresponding interface for allowing charging of the on-board batteries.

All or some of the electronic devices may be arranged at a printed circuit board mounted to the sensor module or to the tool holder.

A protective cover may be arranged over and around the tool holder and the sensor module, such that the position sensors and all electronic components are protected. In this way, the tool holder would have the required robustness and would look much like a conventional tool holder.

According to another aspect, the invention relates to a cutting tool for use in a tool holder as described herein. The cutting tool may comprise a cutting end, a shank end, and an axial portion there between. The shank end may be connectable to the cutting tool connection portion of the tool holder. The cutting tool may comprise at least one pickup arranged to the axial portion.

By using a pickup, rotational and/or axial deflection of the axial portion of the cutting tool may be measured with very high accuracy. In general, the pickup comprises a pattern readable by the position sensors. Preferably, the pickup is symmetrically arranged to the axial portion of the cutting tool in order to not influence the balance of the tool. The cutting tool may be any kind of cutting tool, for example a solid cutting tool or a cutting tool having exchangeable or indexable cutting inserts or cutting tips, including milling tools, drilling tools, tapping tools and boring tools.

The pickup may, for example, comprise a multipole magnet or an optically readable pattern. Thus, rotational and/or axial deflection of the axial portion can be measured using certain kinds of magnetic and/or optical sensors. A pickup comprising a multipole magnet may be used when the sensor module comprises magnetic sensors, such as Hall Effect sensors. Correspondingly, a pickup comprising an optically readable pattern may be used when the sensor module comprises optical sensors. A pattern readable by optical sensors may comprise alternating dark (e.g. black) and light (e.g. white) patches, for example in the form of alternating light and dark stripes. More complex patterns may also be used. A more complex pattern may improve the resolution, and hence the accuracy of the measured deflection. There are various kinds of optical sensors able to read such patterns for sensing positional changes. Such optical sensor may comprise a photodiode array, or other means for detecting light reflected from the pickup.

The pickup may be made of a flexible material circumferentially arranged to the axial portion of the cutting tool, for example circumferentially attached to the surface of the axial portion. Thus, the pickup is easily arranged symmetrically to the cutting tool. Preferably, the pickup is as thin and light as possible in order to not influence the properties of the tool more than necessary. For example, the pickup may be a multipole magnet tape or strip, or a tape or strip comprising an optically readable pattern.

The pickup may also be an integrated part of the axial portion of the cutting tool. For example, a multipole magnet may be circumferentially arranged within a notch formed in the surface of the axial portion of the cutting tool, such that becoming an integrated part of the surface of the cutting tool. With such arrangement, the pickup may not even be visually distinguishable from an ordinary cutting tool without a pickup.

The pickup may comprise an optically readable pattern provided to the axial portion by laser marking, etching, or painting. By this, the optically readable pattern is provided directly onto the surface of the axial portion of the cutting tool. Hence, the pickup is arranged to the cutting tool as an integrated part thereof, and no separate tape, strip, or other bearer of the pattern, needs to be attached to the cutting tool. Such pickup will have a minimal effect on the properties of the cutting tool. An example of a laser marking technique that may be employed is laser engraving.

According to another aspect, the invention relates to a cutting assembly comprising a tool holder as described herein, and a cutting tool comprising a cutting end, a shank end and an axial portion there between, wherein the shank end of the cutting tool is connected to the cutting tool connection portion of the tool holder.

Such cutting assembly may be a chuck with a sensor module arranged thereto, and with a cutting tool being detachably held in the chuck. Alternatively, the cutting assembly may comprise a cutting tool non-detachably fixed to a tool holder with a sensor module. Such a cutting assembly could for example be an integrated cutting tool and tool holder, wherein the cutting tool may be non-detachably connected to, for example integrally formed with, the tool holder.

The coupling end portion of the tool holder of the cutting assembly may be of any conventional type or adapted for a modular quick-change tooling system, such as Coromant Capto® or HSK. In such systems, the coupling end portion may for example be attachable to a machine tool spindle via a basic holder which is meant to stay in the machine while the cutting assembly is changed.

The cutting tool of the cutting assembly may have a central axis which coincides with the tool holder central axis when the cutting tool is in the rest position.

The cutting tool of the cutting assembly may be a cutting tool as described herein comprising a pickup arranged at the outer surface of the axial portion.

According to another aspect, the invention relates to a method for measuring deflection of a cutting tool in a tool holder. The method comprises the steps of:
  determining a rest position of the cutting tool in the tool holder in a state when no machining occurs,
  machining a workpiece with the cutting tool,
  measuring deflection with respect to the rest position of the cutting tool during machining of the workpiece.

The step of measuring deflection with respect to the rest position may be performed by means of at least one position sensor arranged to the tool holder.

BRIEF DESCRIPTION OF DRAWINGS

FIG. 1 shows an example of a sensor module arranged to a tool holder for a cutting tool.

FIG. 2 is a side view of a cutting assembly comprising the sensor module and the tool holder in FIG. 1, and a cutting tool connected to the tool holder.

FIG. 3 is a cross sectional view of the cutting assembly in FIG. 2.

FIG. 4 shows a cutting tool according to an embodiment of the invention.

FIG. 5 is a side view of the cutting tool shown in FIG. 4.

DETAILED DESCRIPTION OF EMBODIMENTS

Figure 6:
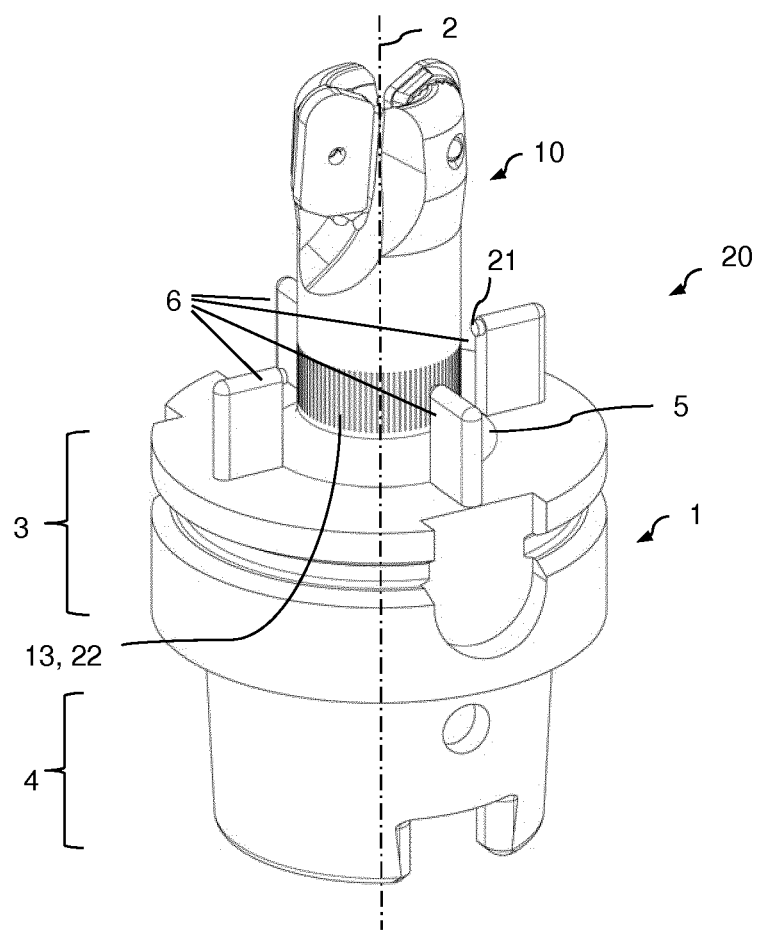
FIG. 6 shows an alternative embodiment of a cutting assembly.

One example of a tool holder for a cutting tool is shown in FIG. 1. This example shows a rotatable tool holder, in this case a chuck 1, for a cutting tool. The tool holder has a central axis 2 extending between a front tool end portion 3 and a rear coupling end portion 4. The coupling end portion of the tool holder is attachable to a machine tool spindle (not shown), in this case via a Coromant Capto® coupling. An internal axial space extends from an opening at the tool end portion into the chuck 1. The axial space is adapted for receiving and clamping a shank of a cutting tool (not shown), such as an end mill or a drill. The tool end portion comprises a cutting tool connection portion 5, which in this case is the portion at which the shank of a cutting tool is clampable. For the purpose of measurement, the axial location of the most anterior point of the cutting tool connection portion 5 may be regarded as reference when measuring deflection of a cutting tool, as described elsewhere herein. The tool holder comprises a sensor module 6 arranged to the tool end portion, forward of the cutting tool connection portion. The sensor module 6 has a top part 23, substantially shaped like a tubular sleeve, and a bottom part 24 having an irregular shape corresponding to the shape of a fixing part 25 of the chuck. The sensor module is firmly attached to the fixing part 25 of the tool holder 1, in this case using screws through holes 26. Four position sensors 7 (of which two are visible in the figure) are arranged within cavities in the sensor module such that the sensors face an internal space within the sensor module. Hence, the position sensors 7 are located around an inner circumferential surface of the sensor module, with an equal spacing of 90 degrees between any two circumferentially adjacent sensors.

According to this example embodiment, the position sensors 7 are inductive sensors used for measuring the distance to a cutting tool, and thus the radial deflection. The inductive position sensors 7 shown in FIGS. 1-3 are only schematically illustrated, and the actual size, extension and shape of the inductive sensors may be different.

Electric leads (not shown) extend from the position sensors to a sensor interface arranged at a printed circuit board 8 mounted on the tool holder.

The shape of the fixing part 25 of the tool holder is adapted for accommodating electric leads extending from the position sensors to the circuit board, as well as for facilitating the mounting of a protective cover (not shown) over the chuck 1 and sensor module 6.

The circuit board 8 comprises a microprocessor for handling and processing the data from the position sensors. Calculations of any related cutting process parameters may be performed in the microprocessor. Alternatively or additionally, such calculations may be performed in an external computer to which any data emanating from the position sensors may be sent. For this purpose, the circuit board also comprises a radio unit having a transmitter for wireless transmission of processed and/or unprocessed sensor data. The position sensors, and the electronic components on the printed circuit board 8, are powered by two batteries 9 arranged on the tool holder. The circuit board may also comprise additional devices. For example, a memory for storing sensor signals over time, or a charging device and a corresponding interface for facilitating charging of the batteries, may be arranged at the circuit board.

FIG. 2 is a side view of the tool holder and sensor module shown in FIG. 1, but with a cutting tool 10, schematically shown in the figure, connected to the tool holder. The cutting tool 10 has a cutting portion 11 forward of the sensor module, and a shank portion 12 which is clamped at the cutting tool connection portion 5. An axial portion 13 of the cutting tool extends through the sensor module 6. Each of the position sensors 7 are located radially spaced from the axial portion 13 of the cutting tool 10, with a distance d. In FIG. 2, the cutting tool is shown in a rest position. This position corresponds to the position that the axial portion of the cutting tool assumes with respect to the position sensors, both in a radial, axial and tangential direction, when no machining occurs. In this exemplary embodiment, the central axis of the cutting tool 10 coincides with the tool holder central axis 2 when the cutting tool is in the rest position (i.e. there is no radial deflection of the cutting tool).

FIG. 3 shows a cross-section of the cutting tool 10 and the position sensors 7, 7', 7'', 7''' in a plane perpendicular to the tool holder central axis at a location corresponding to the axial portion 13 of the cutting tool 10. For illustrative purposes, the tool holder and structural parts of the sensor module are not shown in FIG. 3. The cutting tool 10 is in the rest position. Hence, the distance d between a position sensor and the surface of the cutting tool is the same for all sensors (i.e. no radial deflection). Each of the position sensors is able to detect the distance to the surface of the cutting tool. As a consequence, a radial deflection in any direction of the axial portion of the cutting tool can be measured by analyzing the signal from at least one of the sensors 7', 7''' measuring the distance in the x-direction and the signal from at least one of the sensors 7, 7'' measuring the distance in the y-direction.

FIG. 4 (isometric view) and FIG. 5 (side view) are schematic illustrations of another embodiment of the invention where the location of position sensors 14, 15, 16, 17 are illustrated in relation to a cutting tool 10 mounted in a tool holder. For illustrative purposes, the tool holder and structural parts of the sensor module are not shown in FIGS. 4 and 5. However, the tool holder central axis 2 (corresponding to the central axis of the cutting tool) is shown. The position sensors 14-17 are magnetic sensors arranged to measure rotational and axial deflection by sensing movement of two pickups 18, 19 arranged on the surface of the axial portion 13 of the cutting tool 10. Position sensors 14, 15 are arranged on opposite sides of the cutting tool (i.e. circumferentially spaced around the cutting tool by 180 degrees) and correspond to a first sensor pair for measuring axial deflection. The position sensors 16, 17 are arranged around the cutting tool in a corresponding way and correspond to a second sensor pair for measuring rotational deflection. The first and second sensor pairs are arranged such that the sensors 14-17 are circumferentially spaced around the axial portion 13 of the cutting tool 10 by 90 degrees. The axial position sensors 14, 15 detect movements of the axial pickup 18, and the rotational position sensors 16, 17 detect tangential movements of the tangential pickup 19. The axial pickup comprises a multipole magnet with the magnetic poles alternating in the axial direction of the cutting tool. The tangential pickup comprises a multipole magnet with the magnetic poles alternating along a tangential direction of the cutting tool. The pickups 18, 19 are thin and made of a flexible material facilitating arranging the pickups circumferentially around the cutting tool. Since the pickups 18,19 are thin and light and arranged symmetrically with respect to the rotational axis of the cutting tool, they will not significantly affect the balance or other properties of the cutting tool.

The position sensors 14-17 are magnetic position sensors based on the Hall Effect. Such sensors have an output voltage varying in response to a magnetic field. As the axial multipole magnet pickup 18 moves in the axial direction, the magnetic field sensed by the axial position sensors 14,15 will change. Correspondingly, when the rotational multipole magnet pickup rotates, the magnetic field sensed by the rotational position sensors 16,17 will change. Consequently, the output voltage of the position sensors 14-17 will reflect movements of the pickups 18-19 (i.e. rotational or axial deflection of the axial portion of the cutting tool).

By calculating the axial and rotational deflection as the mean value of the signals from the axial sensors 14, 15 and the rotational sensors 16, 17, respectively, the deflections can be separated from radial deflections that also might result in a measured position change at any of the sensors 14-17. For example, a radial deflection in a direction towards any of the axial position sensors 14, 15, would result in a detected movement at both rotational sensor 16, 17. However, although these signals will have the same magnitude, they will have opposite signs and therefore cancel each other. When measuring a true rotational deflection, though, the detected rotation at both rotational sensors 16, 17 will have the same direction. Therefore, when determining the rotational deflection as the mean value of the sensor signals (that is: $(S_{16}+S_{17})/2$ where $S_{16}$ is the signal from the first rotational sensor 16, and $S_{17}$ is the signal from the second rotational sensor 17), radial deflections will not falsely be identified as rotational deflection.

In a corresponding way, the mean value of the signals from the axial sensors 14 and 15 are used as a measure of the axial deflection.

As seen in FIGS. 4-5, since there are different pickups 18, 19 for axial and rotational deflection, the position sensors are located at slightly different positions along the tool holder central axis 2. This difference in axial position must be taken into consideration when determining the deflection. This is because a certain deflection (axial, rotational or radial) at the tool tip will result in a different measured deflection depending on the axial location of the sensor. That is, the closer to the front end of the cutting tool that a position sensor is located, the greater will the measured deflection be. Therefore, the axial distance from each position sensor to the reference point used for the measurements (for example the axial location of the cutting tool connection portion being closest to the sensor module) must be known.

The output voltage of the Hall effect sensors 14-17 also depends on the distance to the cutting tool, since the magnetic field that the sensors 14-17 are exposed to will vary with distance to the corresponding multipole magnets of the pickups 18, 19. Hence, both the tangential position sensors 16, 17 and the axial position sensors 14, 15 can be used for measuring the distance to the cutting tool. Since this distance is measured in multiple directions, the radial deflection of the axial portion of the cutting tool can be measured in a corresponding way as discussed with reference to FIG. 3. However, the different axial locations of the rotational position sensors and the axial position sensors might have to be taken into consideration when calculating the radial deflection. This is easily compensated for if the distances are known.

With reference to FIG. 6, an alternative embodiment is described wherein a cutting assembly 20 is shown. The coupling end portion 4 of the tool holder 1 is attachable to a machine tool spindle via a HSK coupling. In this embodiment, the tool holder 1 is integrated with the cutting tool 10, in this case a milling cutter with indexable cutting inserts. Hence, the cutting tool is non-detachably connected to the tool holder, and formed as an integral part thereof. In such embodiment, the cutting tool connection portion 5 is the interface between the cutting tool and the tool holder, where the cutting tool is non-detachably connected (e.g. integrally formed) to the tool holder. The sensor module 6 comprises separately mounted sensor posts with optical position sensors 21 arranged to face the axial portion 13 of the cutting tool 10. The sensor posts are attached to the tool end portion 3 of the tool holder by screws. In alternative embodiments, the sensor posts could be attached by glue, brazing or other suitable means. Although not shown in the figure, the cutting assembly 20 also comprises a sensor interface to which electrical leads extend from the position sensors 21, a microprocessor, a radio unit, and a power supply for powering the sensors and all other electronic devices.

The axial portion 13 of the cutting tool 1 comprises a pickup 22 in the form of a laser engraved pattern of alternating light and dark stripes. Each optical position sensor 21 comprises a photodiode array or similar means for detecting light. Light reflected from the laser engraved pattern and reaching the photodiode array is detected. Using a pickup with stripes arranged along the axial direction of the cutting tool, as shown in FIG. 6, tangential movements of the pickup, and thus rotational deflection, can be measured.

Figure 7:
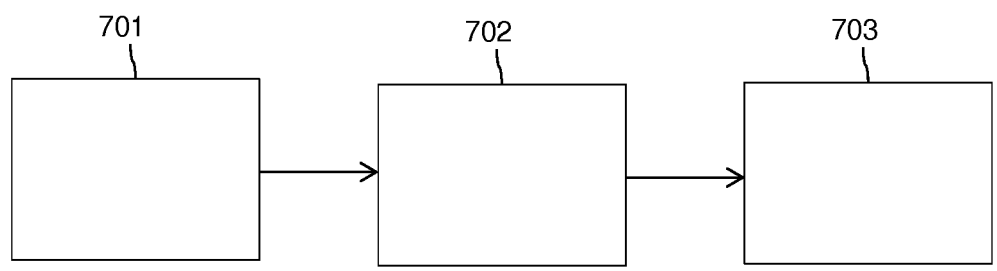
FIG. 7 is a flowchart illustrating a method according to an embodiment of the invention.

FIG. 7 illustrates the steps of a method according to an embodiment of the invention.

At step 701, a rest position of the cutting tool in the tool holder is determined in a state when no machining occurs. This rest position may be defined by one or more of a radial, rotational and axial position of an axial portion of the cutting tool, as sensed by one or more position sensors at a time when no machining occurs.

At step 702, a workpiece is machined with the cutting tool. The machining may be any kind of machining wherein a cutting tool connected to a tool holder is used for machining the workpiece.

At step 703, the deflection with respect to the rest position of the cutting tool is measured during machining of the workpiece. The deflection may be one or more of radial deflection, rotational deflection and axial deflection. Measured deflection may be the deflection of an axial portion of the cutting tool.

The invention claimed is:

1. A sensor module for a tool holder for a rotating cutting tool, wherein when the sensor module is arranged at the tool holder having a cutting tool connected thereto such as to rotate together with the tool holder and the cutting tool during machining of a workpiece, an axial portion of the cutting tool being positionable in a predefined rest position with respect to the sensor module, the sensor module having at least four position sensors, wherein, when the sensor module is arranged to the tool holder having a cutting tool connected thereto, the at least four position sensors are located radially spaced from the axial portion of the cutting tool for measuring deflection of the cutting tool with respect to the predefined rest position, the at least four position sensors being arranged to measure radial deflection, by sensing the radial distance to the axial portion of the cutting tool, rotational deflection, by sensing tangential movement of the axial portion of the cutting tool, and/or axial deflection, by sensing axial movement of the axial portion of the cutting tool, wherein two or more position sensors of the at least four position sensors are arranged to measure at least the radial deflection, wherein the two or more position sensors are spaced circumferentially in relation to the circumference of the axial portion of the cutting tool, and the two or more position sensors being circumferentially adjacent are spaced by an angle less than 180 degrees, wherein a first pair of position sensors of the at least four position sensors is arranged to measure at least rotational deflection, and wherein the position sensors of the first pair are spaced circumferentially in relation to the circumference of the axial portion of the cutting tool by an angle of approximately 180 degrees.

2. The sensor module according to claim 1, wherein the at least four position sensors are arranged to measure at least the radial deflection are spaced by an angle of approximately 90 degrees.

3. The sensor module according to claim 1, wherein a second pair of position sensors of the at least four position sensors is arranged to measure at least rotational deflection or at least axial deflection, wherein the position sensors of the second pair are spaced circumferentially in relation to the circumference of the axial portion of the cutting tool by an angle of approximately 180 degrees, and arranged such that each position sensor of the second pair is circumferentially spaced from each position sensor of the first pair by an angle of approximately 90 degrees.

4. The sensor module according to claim 1, wherein each of the at least four position sensors is selected from any of an inductive sensor, an optical sensor, a magnetic sensor, a capacitive sensor, and an ultrasonic sensor.

5. The sensor module according to claim 1, further comprising a sleeve-shaped portion, wherein the sensor module is attachable to the tool holder such that the axial portion of the cutting tool connected to the tool holder extends through the sleeve-shaped portion, and wherein the at least four position sensors are arranged at an inner surface of the sleeve-shaped portion.

6. A tool holder for a rotating cutting tool, the tool holder comprising:
a tool holder body having a rear coupling end portion and a front tool end portion and a tool holder central axis extending therebetween; and
a sensor module according to claim 1 arranged to the tool end portion, wherein the coupling end portion is attachable to a machine tool, and the tool end portion includes a cutting tool connection portion.

7. The tool holder according to claim 6, further comprising a displacement sensor arranged to detect if a cutting tool connected to the cutting tool connection portion of the tool holder is slipping in relation to the cutting tool connection portion.

8. The tool holder according to claim 6, wherein the tool holder has a substantially cylindrical shape.

9. The tool holder according to claim 6, wherein the tool holder is a chuck and wherein the cutting tool connection portion is an axial space of the chuck in which a shank end of a cutting tool is arranged to be received and clamped.

10. The tool holder according to claim 6, wherein the cutting tool includes a cutting end, a shank end, and an axial portion there between, wherein the shank end is connectable to the cutting tool connection portion of the tool holder, and the cutting tool includes at least one pickup arranged at the axial portion.

11. The tool holder according to claim 10, wherein the at least one pickup is selected from a multipole magnet, and an optically readable pattern.

12. The tool holder according to claim 10, wherein the at least one pickup is made of a flexible material circumferentially arranged to the axial portion.

13. The tool holder according to claim 10, wherein the at least one pickup includes an optically readable pattern provided to the axial portion by any of laser marking, etching, and painting.

14. A cutting assembly, comprising:
a tool holder according to claim 6; and
a cutting tool including a cutting end, a shank end and an axial portion therebetween, wherein the shank end of the cutting tool is connected to the cutting tool connection portion of the tool holder.

15. The cutting assembly according to claim 14, wherein the cutting tool has a central axis which coincides with the tool holder central axis when the cutting tool is in the predefined rest position.

16. The cutting assembly according to claim 14, wherein the shank end is connectable to the cutting tool connection portion of the tool holder, and the cutting tool includes at least one pickup arranged at the axial portion.

\* \* \* \* \*